United States Patent [19]

Lewis et al.

[11] 4,116,750

[45] Sep. 26, 1978

[54] SHEET BINDING APPARATUS

[75] Inventors: Barry J. Lewis, Federal Way; John C. Kuspert, Seattle; Arthur G. Saunders, Maple Valley; Robert R. McAusland, Seattle, all of Wash.

[73] Assignee: Norfin, Inc., Seattle, Wash.

[21] Appl. No.: 777,730

[22] Filed: Mar. 15, 1977

[51] Int. Cl.$^2$ ........................ B32B 31/00; B05C 1/00; B42B 1/02

[52] U.S. Cl. .................................... 156/563; 118/202; 118/257; 156/578; 270/53; 271/173

[58] Field of Search ................ 156/578, 563; 118/202, 118/257, 257 R, 257 AB, 257 B; 270/37, 53; 271/173

[56] References Cited

U.S. PATENT DOCUMENTS

| | | | |
|---|---|---|---|
| 1,528,935 | 3/1925 | MacDonald | 118/257 |
| 2,684,047 | 7/1954 | Walker | 118/202 |
| 3,067,718 | 11/1962 | Kraft | 118/257 |
| 3,973,515 | 8/1976 | Demand | 118/202 |

*Primary Examiner*—Douglas J. Drummond
*Attorney, Agent, or Firm*—Dowrey & Cross

[57] ABSTRACT

The sheet binding apparatus is comprised of a movable binder assembly including an endless belt and an elongated heat application platen underlying one belt run. The belt is coated with a hot-melt adhesive, which, when heated by the platen, is applied by the belt to the co-planar sheet edges of one or more stacks of sheets assembled within individual bins of a collator. A belt lifting assembly controls heat transfer between the platen and belt by appropriate positioning of the belt with respect to the platen. The binder assembly is movable reciprocatively toward a sheet contacting binding position along a path perpendicular to the coplanar sheet edges. That assembly is further movable reciprocatively toward one or more additional binding positions along a path parallel to the coplanar sheet edges. In a second preferred embodiment, the binder assembly is swung along the first path by lost motion hinges.

21 Claims, 15 Drawing Figures

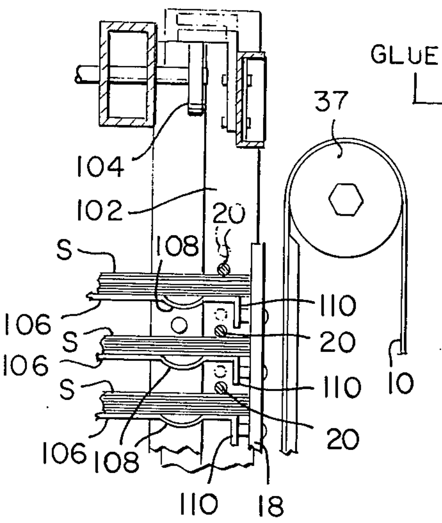
FIG. 6
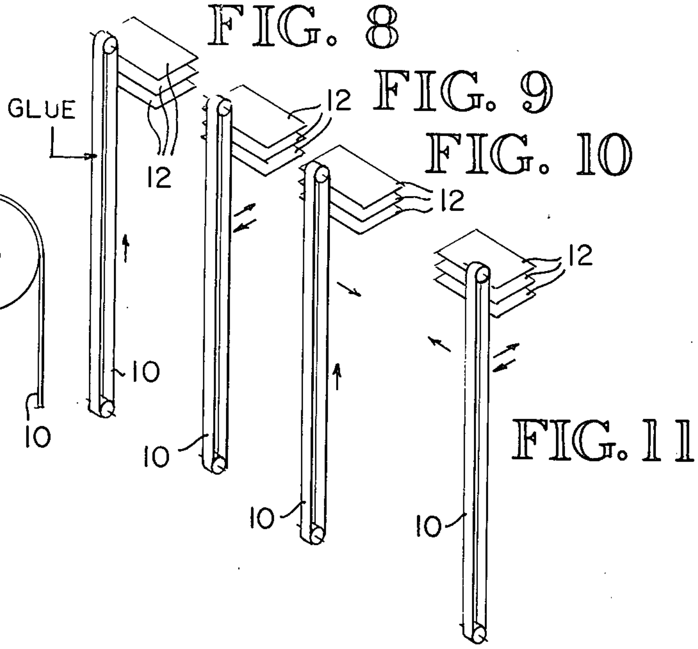
FIG. 8
FIG. 9
FIG. 10
FIG. 11
FIG. 7
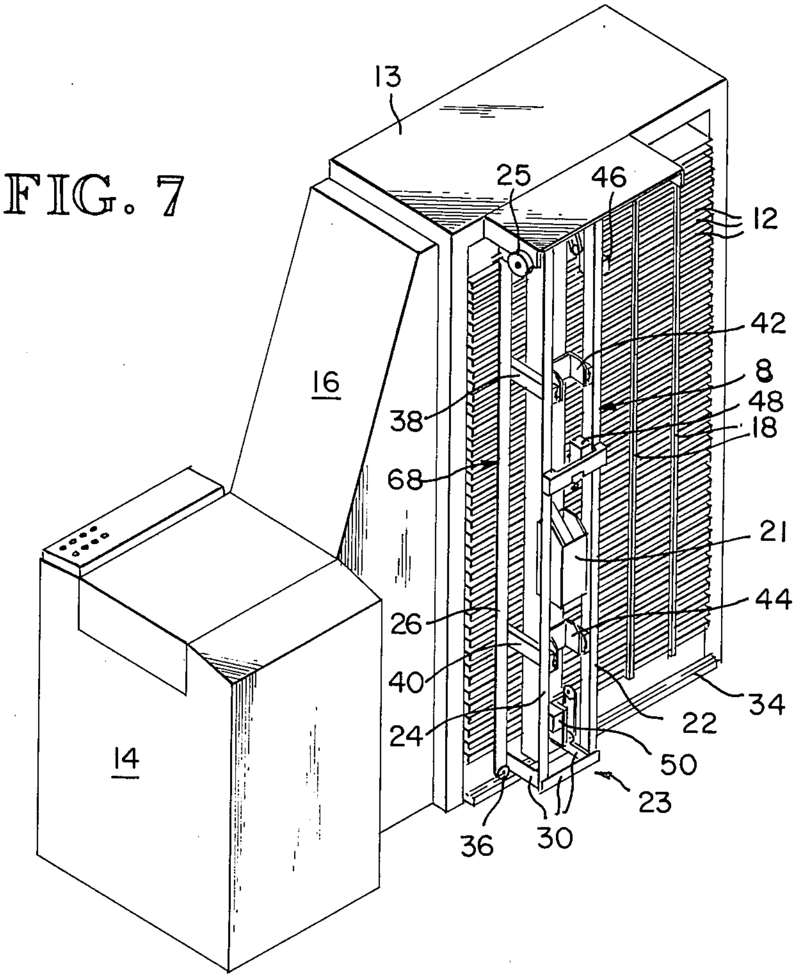

SHEET BINDING APPARATUS

BACKGROUND OF THE INVENTION

This invention relates to sheet binding apparatus.

The sheet binding apparatus disclosed in U.S. Pat. No. 4,009,071, assigned to the assignee of the present invention, continuously applies heat to the adhesive or glue on the glue belt between binding cycles. The glue therefore tends to "cook" while on the belt, and, after sufficient time, loses its consistency while giving off undesirable smoke or fumes. Although the belt is scraped during a clean-up sequence following binding, sufficient residual glue still remains on the belt that some or all of these conditions persist, as long as the platen remains heated. In many practical applications, therefore, uneconomical filters and/or blowers are necessary to dispel the smoke or fumes generated, and glue reliability is questionable.

SUMMARY OF THE INVENTION

This invention provides an improvement in the sheet binding apparatus disclosed in the aforementioned United States Patent by controlling heat transfer between the platen and glue belt through selective positioning of the belt with respect to the platen. This invention additionally provides improvements to the heater bar assembly associated with the platen, the means by which the belt is moved with respect to the sheets for binding, and other features of that binding apparatus. Some or all of these improvements, of course, could be applied to other binding apparatus.

These and other features, objects and advantages of the present invention will become apparent in the detailed description and claims to follow taken in conjunction with the accompanying drawings in which like parts bear like reference in numerals.

BRIEF DESCRIPTION OF THE DRAWINGS

FIG. 6 is a vertical section of the sheet hold down assembly and associated bin structure of the sheet binding apparatus of this invention;

FIG. 7 is a rear perspective view of the sheet binding apparatus of this invention, including the FIGS. 1A, 1B sheet binder assembly;

FIGS. 8–11 are schematic outlies depicting operation of the FIG. 7 sheet binding apparatus;

DETAILED DESCRIPTION OF THE DRAWINGS

Figure 1A:
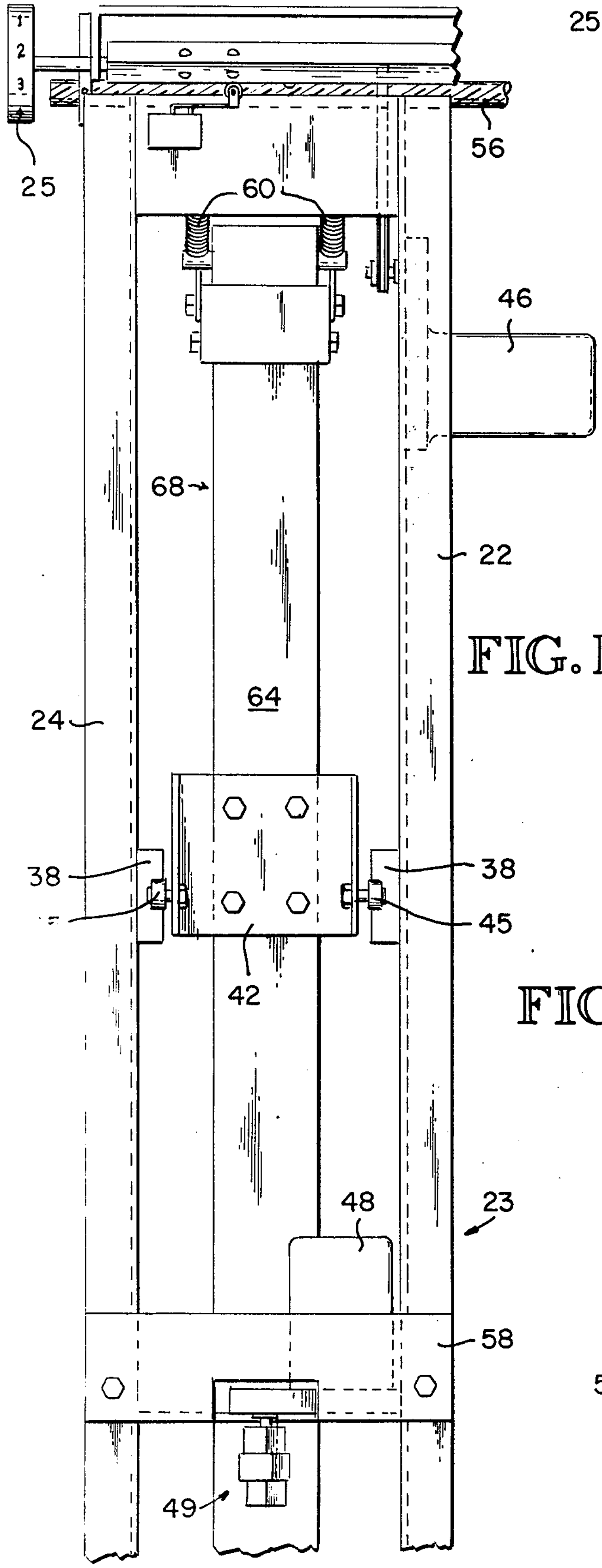
FIGS. 1A and 1B together constitute a rear elevation of the improved sheet binder assembly of the sheet binding apparatus of this invention.

Referring first to FIGS. 7–11 of the drawings, the sheet binding apparatus of this invention is comprised of a movable binder assembly (referenced generally by numeral 8 in FIG. 7), which includes an endless belt 10 (FIGS. 8–11) for applying adhesive to the coplanar sheet edges of one or more groups or stacks of sheets assembled within individual receiver bins or compartments 12 associated with a vertical bin column in a suitable sheet receiver 13. In the illustrated example of FIG. 7, a sheet feeder 14 feeds sheets to a distributor 16, which distributes and stacks them in appropriate sequence within the compartments 12. Appropriate jogging apparatus (not shown) engage and align the edges of stacked sheets within compartments 12 with their side edges adjacent the binder assembly 8 in coplanar alignment against two or more fixed elongated vertical backstops 18. Sheet hold down members 20 (FIG. 6) engage and maintain the sheets in coplanar edge alignment during binding.

Figure 1B:
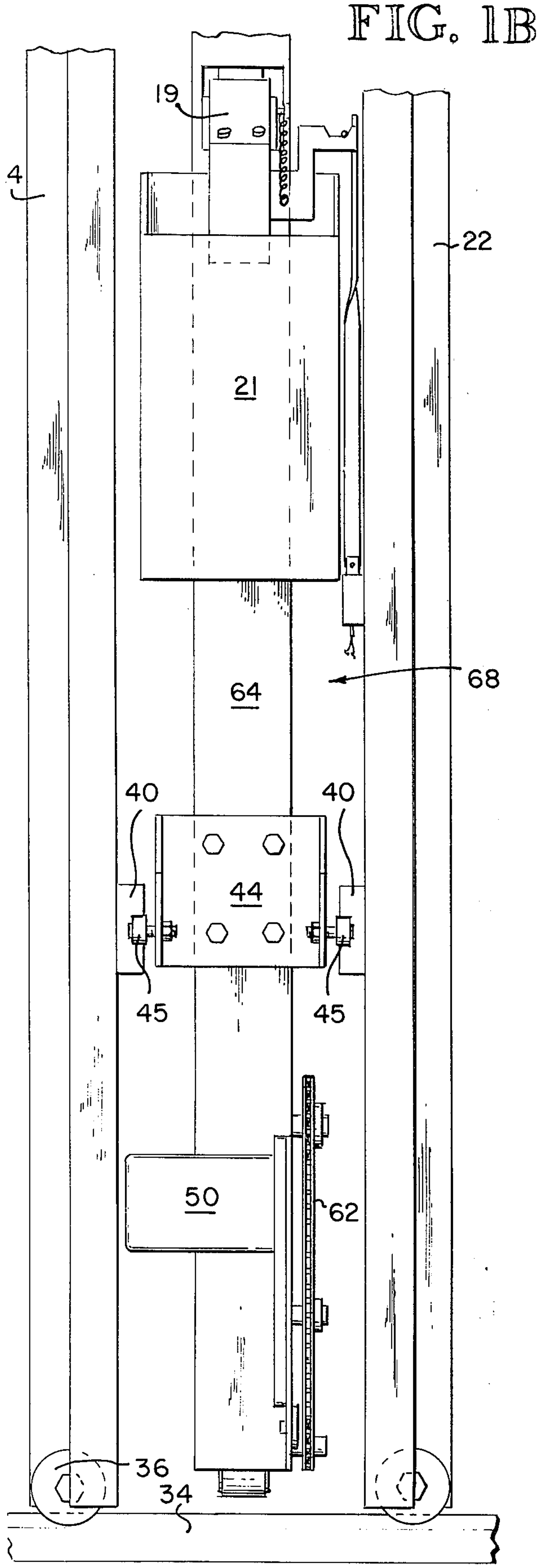
Figure 4:
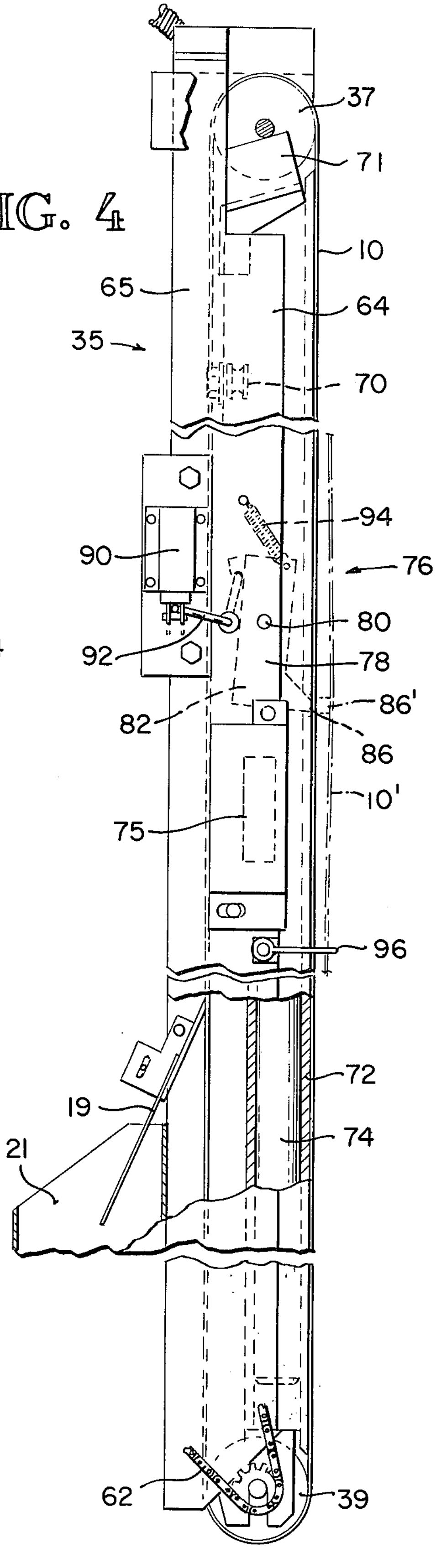
FIG. 4 is a side elevation of the FIG. 3 heater bar assembly, with parts broken away.

Referring now to FIGS. 8–11, the binding apparatus, in brief, is operative to adhesively bind selected groups of sheets within compartments 12 at selected locations along their coplanar sheet edges. As depicted in FIG. 8, belt 10 is rotated in the direction indicated by the arrow and simultaneously is coated with a suitable heat activatable adhesive, preferably a hotmelt adhesive supplied from a glue pot 21 (FIG. 7). The extent of adhesive application to belt 10 determines the number of compartments to which adhesive application is made. As depicted in FIG. 9, belt 10 thereupon is moved along a rectilinear path perpendicular to the coplanar sheet edges toward a binding position in which the glue coated portion of belt 10 simultaneously contacts the coplanar sheet edges of one, two, or more sheet groups. Upon completion of binding, the belt is returned along the same path to a retracted position spaced from the coplanar sheet edges. The adhesive application and binding steps of FIGS. 8 and 9 thereupon may be repeated at the same binding position, depending upon the thickness of the sheet stack. For thin stacks (e.g. under 0.25 inches in thickness), the belt need not be completely recoated with adhesive but can be rotated only a distance sufficient to present a fresh belt surface for the second adhesive application. These steps can be repeated at one or more additional locations along the length of the coplanar sheet edges by moving the belt laterally along a second rectilinear path parallel to the coplanar sheet edges toward a new location and then repeating the aforementioned adhesive application and binding steps as depicted in FIGS. 10 and 11. The number and location of adhesive bonds effected is controllable by programmer 25 (FIG. 7). Upon completion of this binding sequence, the belt is subjected to a suitable clean-up process whereby glue is scraped from the belt's outer surface by scraper 19 (FIGS. 1B and 4). The basic construction and operation of the foregoing apparatus is illustrated and described in additional detail in U.S. Pat. No. 4,009,071, assigned to the assignee of the present invention. The disclosure of said U.S. Pat. No. 4,009,071 is incorporated herein by reference.

The binder assembly 8 will now be described in further detail with reference to FIGS. 1–7 of the drawings. Referring first to FIG. 7, assembly 8 includes an elongated support frame generally referenced by numeral 23 in FIG. 7) made up of four corner members 22, 24, 26, 28 (member 28 not shown in FIG. 7) which are connected together at their upper and lower ends by side members 30. This frame is mounted by receiver 13 in vertical alignment adjacent the side of compartments 12 for lateral reciprocative movement with respect thereto to accomplish the FIGS. 10 and 11 belt movement. Upper and lower guide tracks 32, 34 (upper track 32 illustrated in FIG. 2A) are secured to and extend along the upper and lower edges of the bin column. These tracks engage and guide suitable wheels 36 mounted by the upper and lower ends of frame 23.

A heater bar assembly (generally referenced by numeral 68 in FIG. 7) rotatively supports belt 10 and is movable transversely with respect to the frame 23 to accomplish the FIG. 9 belt movement. Belt 10 is trained about upper and lower rollers 37, 39 (FIGS. 2A, 2B), which are mounted by the upper and lower ends of assembly 68, respectively. Assembly 68 is movable reciprocatively with respect to frame 23 in a direction perpendicular to the coplanar sheet edges of sheets within compartments 12, or perpendicular to the direction of frame movement (refer again to FIGS. 9 and 11). It is supported from frame 23 by guide tracks and rollers most clearly illustrated in FIGS. 1A, 1B, and 2A, 2B. Upper and lower pairs of horizontal guide tracks 38, 40 are connected between corner members 22, 24, 26, 28 as shown. Generally U-shaped support brackets 42, 44 are secured to the rear face of assembly 68 and mount suitable wheels or rollers 45 which ride along tracks 38, 40.

Figure 2A:
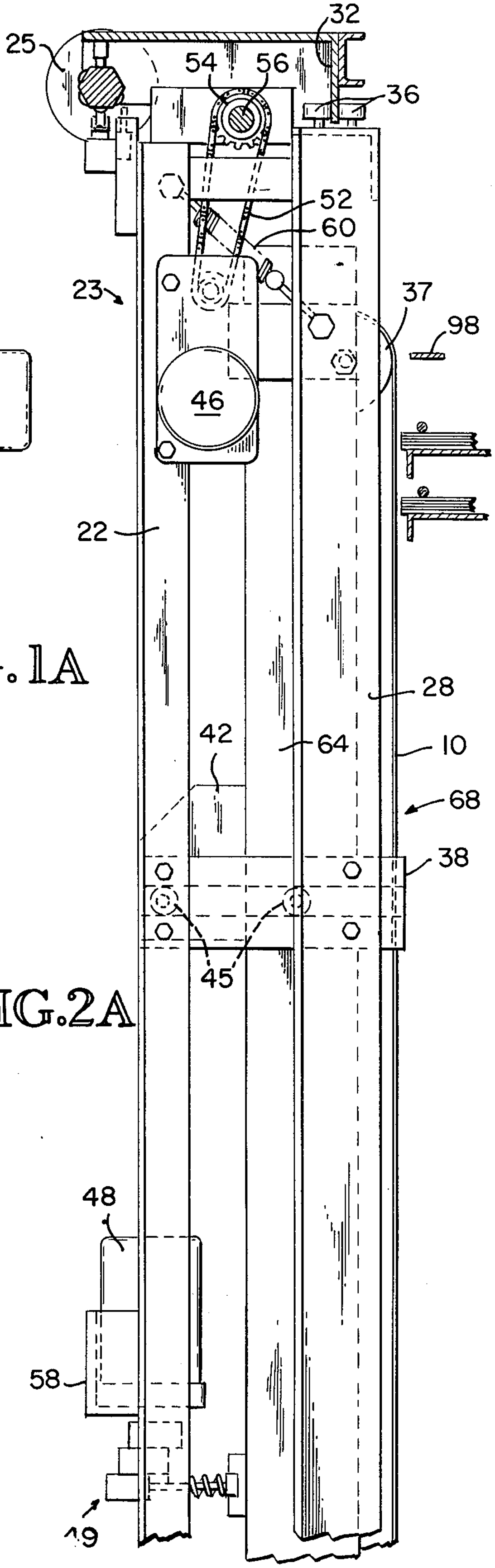
FIGS. 2A and 2B together constitute a side elevation of the FIGS. 1A, 1B sheet binder assembly.
Figure 2B:
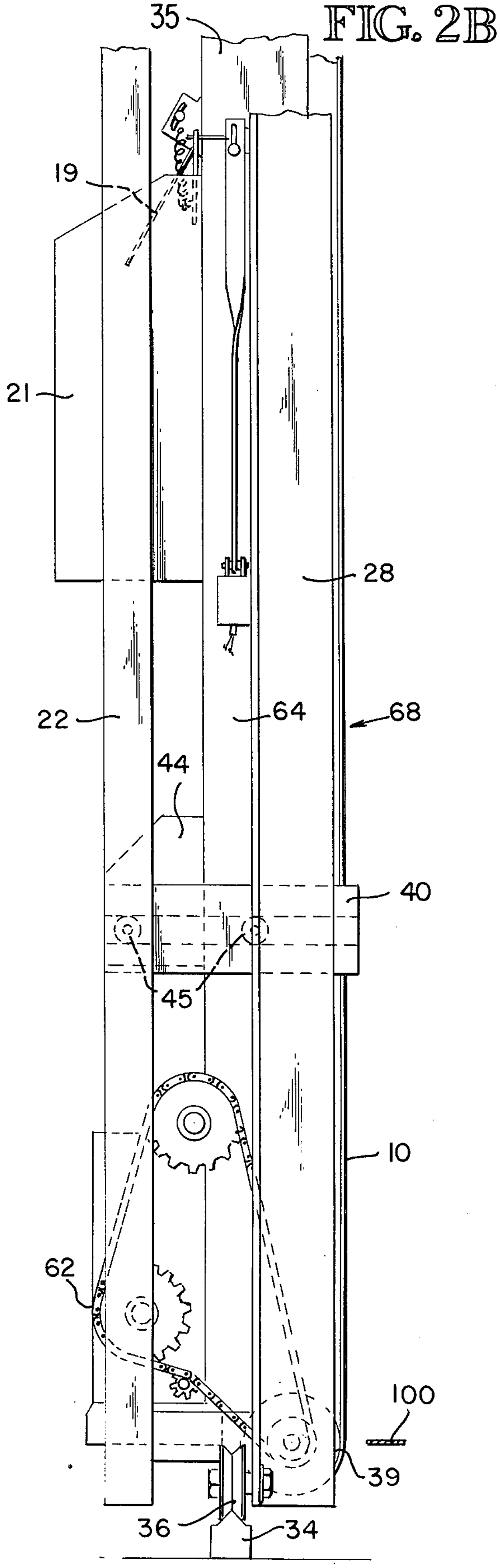

Three drive motors 46, 48 and 50 are operatively connected with and produce the aforementioned movement of frame 23, assembly 68 and belt 10 respectively. Referring first to FIGS. 1A and 2A, motor 46 is mounted from the upper portions of frame members 22, 28 and is connected by a drive chain 52 with a travelling nut 54. This nut is threaded upon and, when driven by motor 46, causes frame 23 to move with respect to a worm gear 56, which is mounted rotatively at its ends by the receiver 13. Motor 46 is bidirectional and therefore produces lateral reciprocative movement of frame 23 with respect to receiver 13, (see FIGS. 10 and 11) depending upon the direction in which nut 54 is driven thereby. Motor 48 is mounted by bracket 58 between the intermediate portions of frame members 22, 24 and is connected to assembly 68 by a suitable cam drive 49 for moving assembly 68 and belt 10 to and from the aforementioned binding position (see FIG. 9). Assembly 68 is biased toward a retracted position in which the belt 10 is spaced from the sheet edges by springs 60 secured to frame 23. Referring next to FIGS. 1B and 2B, motor 50 is mounted by the lower end portion of assembly 68 and is connected by drive chain 62 to the lower belt support roller 39, as shown (FIG. 2B), for exerting rotational driving effort on belt 10 in the direction indicated by arrows in FIGS. 8 and 10.

Figure 3:
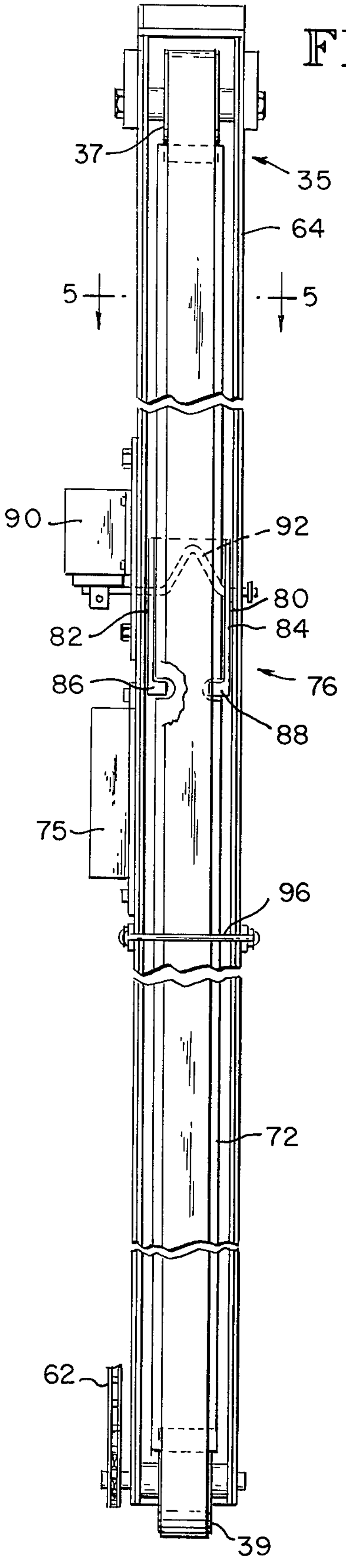
FIG. 3 is a front elevation of the heater bar assembly of the FIGS. 1A, 1B sheet binder assembly in reduced scale with parts broken away.
Figure 5:
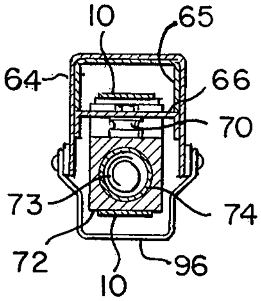
FIG. 5 is a section taken along the line 5—5 in FIG. 3.

In the illustrated example, the adhesive applied is a hotmelt adhesive which is heat activated by the heater bar assembly 68 associated with belt 10. Referring to FIGS. 3–5, assembly 68 is housed within an elongated open-sided exterior housing 64, generally U-shaped in transverse section, and an interior channel 65 having a transverse flange 66. This flange supports the heater bar assembly 68 but is thermally insulated therefrom by one or more intervening spacers 70 composed of thermal insulating material. It is housing 64 to which brackets 42, 44 are secured to mount the heater bar assembly from frame 23. Housing 64 also rotatively supports rollers 37 and 39 at its upper and lower ends, respectively, as shown (FIG. 4). An inclined drip shield 71 projects from the upper end portion of housing 64.

Referring again to FIG. 5, the heater bar assembly includes an elongated platen 72 having a square exterior outline and a cylindrical inner bore. The outer surface of platen 72 underlies the inner face of belt 10 adjacent the belt run, which faces the open side of housing 64. (It is this belt run which constitutes the adhesive application surface.) A cylindrical heating element registers with and is positioned within this inner bore for heating platen 72. This element is made up of a cylindrical outer casing 74, which contains one heating element 73 energized electrically by means not shown. Platen 72 and the associated heating element correspond in length to the height of the compartments 12 within the bin column to which heat application is to be made. A suitable temperature sensor 75 (FIGS. 3 and 4) is mounted on one side of housing 64 and monitors belt temperature.

Referring now to FIGS. 3 and 4, in particular, a belt lifting assembly 76 is mounted by housing 64 intermediate the length thereof. Assembly 76 includes a rocker plate 78 which is pivotally supported for rotative movement about transverse pivot 80 (FIG. 4). Plate 78 includes two spaced apart arm portions 82, 84 which extend adjacent respective sides of assembly 68 and terminate in respective lifting fingers 86, 88, both underlying belt 10. An appropriate single-acting actuator 90 is mounted on one side of housing 64 adjacent sensor 75 and is operatively connected with the upper end portion of plate 78 to one side of pivot 80 by pivot link 92 so as to rotate plate 78 in one direction (clockwise direction as illustrated in FIG. 4) when actuated. Such rotation causes fingers 86, 88 to move toward a retracted position referenced by numeral 86 in FIG. 4. A tension spring 94 (FIG. 4) is secured to plate 78 to the other side of pivot 80 and hence exerts a force which tends to rotate plate 78 in an opposite direction (counterclockwise as illustrated in FIG. 4), whereby fingers 86, 88 move toward an extended position referenced by numeral 86′ in FIG. 4. In their extended position, fingers 86, 88 lift belt 10 from substantial contact with platen 72 to the position referenced by 10′ in FIG. 4. Thus, it is possible, by appropriate operation of actuator 90, to maintain the belt out of substantial contact with platen 72 except when desired for binding purposes. As a result, the platen can be heated continuously while heat transferred to the belt 10 is controllable by appropriate positioning of belt 10 with respect to platen 72. Consequently, glue consistency is maintained, and smoke or fumes are minimized or eliminated, all without need for blowers or filters in most practical applications.

Still referring to FIGS. 3–5, a belt retainer 96 of generally U-shaped construction is secured to housing 64 and spans the exposed run of belt 10 at close clearance. Retainer 96 is so positioned that it will engage and prevent further transverse movement of belt 10 in the event belt 10 sticks to the sheets during retractive movement following binding. Retainer 96 does, however, permit a certain amount of transverse belt movement as required to obtain proper operation of the belt lifter assembly 76.

To maintain vertical alignment of the belt at its advanced binding position, upper and lower stops 98 and 100 (FIGS. 2A, 2B) may be provided. These stops project from the receiver in appropriate vertical disposition for engaging and positioning the belt at two vertically spaced apart locations in respective diametric opposition to rollers 37 and 39. In the example, stops 98 and 100 have reduced area belt contact edges generally similar to knife edges in order to minimize sticking.

Referring now to FIG. 6, hold down members 20 are movable vertically between respective lowered hold down positions (solid lines) and raised retracted positions (dotted lines) by a weight frame 102, the vertical position of which is controlled by an eccentric motor driven lifting cam 104. Shelves 106 respectively form individual underlying recesses in which members 20 are shielded at their raised retracted positions from contact with the sheets S during distribution and jogging. These recesses are formed between dimples 108 and flanges 110. Each shelf includes a series of such dimples which extend in a line parallel to flange 110 and spaced therefrom a sufficient distance to receiver member 20 therebetween, as shown in dotted lines in FIG. 6. The illustrated construction thus prevents premature contact of members 20 with the sheets S while members 20 are in their raised retracted positions and further stiffens the shelves 106. (Backstops 18 are secured to the outer faces of flanges 110).

Figure 12:
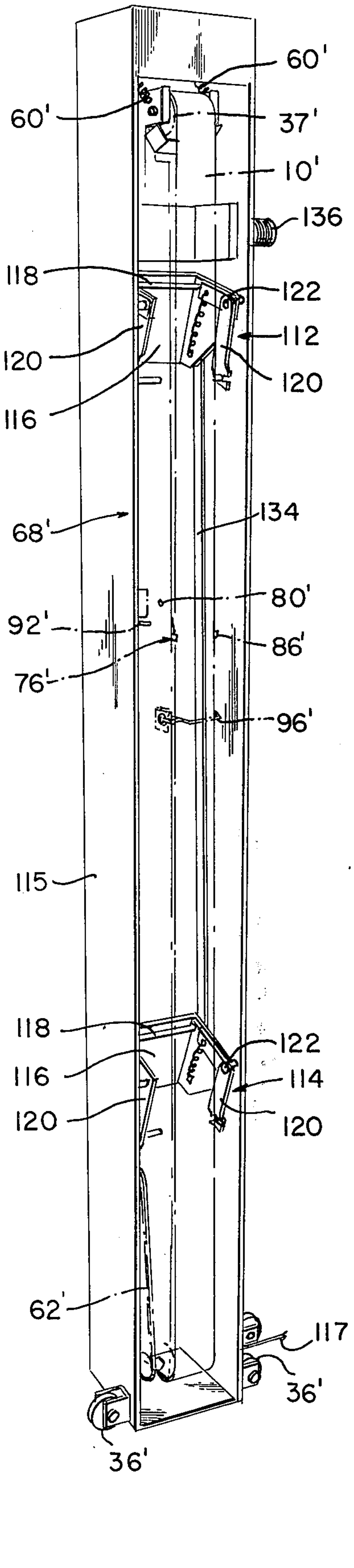
FIG. 12 is a front perspective view of a second preferred embodiment of the sheet binder assembly.
Figure 13:
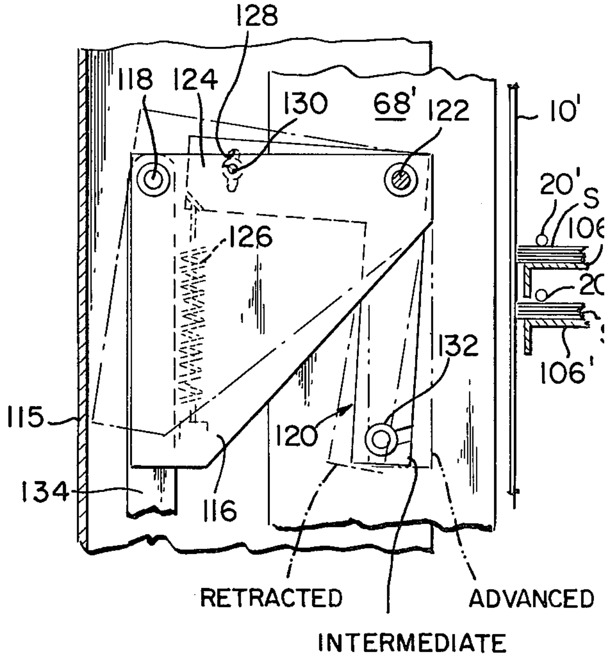
FIG. 13 is a side elevation in enlarged scale, partly in vertical section, of one hinge associated with the FIG. 12 sheet binder assembly.

A second preferred embodiment of the binder assembly of this invention is depicted in FIGS. 12 and 13 of the drawings, in which parts corresponding to parts already illustrated and described herein are designated with the same reference numerals, primed. Housing 115 is carried by lower rollers 36′ which ride along guide tracks not shown identical to the FIG. 2B track 34, while the upper end of housing 115 is guided by two upper rollers and a guide track identical to FIG. 2A rollers 36 and track 32. This housing is positionable selectively along the length of the coplanar sheet sheet edges, as depicted in FIGS. 10 and 11, by a winch system which includes winch drum 134 and cable 117. The housing, rollers and guide tracks, and winch system are illustrated and described in further detail in the aforementioned U.S. Pat. No. 4,009,071.

The hinges 112, 114 are identical. One hinge is illustrated in enlarged scale in retracted, intermediate and advanced positions. Each hinge includes a generally U-shaped pivot plate 116, which is supported pivotally by transverse pivot pins 122 from housing 115. Two L-shaped lost motion arms 120 are connected pivotally intermediate their length by respective pins 122. The upper inner end 124 of each lost motion arm is connected by spring 126 to the lower end of plate 116 and includes a slot 128. A keeper pin 130 projects from plate 116 into this slot. The lower outer end 132 of each lost motion arm is connected with and supports assembly 68′. Pins 118 extend through the upper, inner corners of each plate 116 and are connected by links 134 (only one link shown) so that hinges 112, 114 move in unison as a parallelogram linkage.

In response to a force applied by winch drum 136 (FIG. 12), therefore, hinges 112, 114 swing assembly 68′ toward its advanced position; however, contact between belt 10′ and the sheets S, or between belt 10′ and stops 98, 100, occurs at an intermediate position of arms 120 before plates 116 complete their full swing. Further movement of plates 116 toward their fully extended solids lines position causes arms 120 to swing with respect thereto about pins 122 against the bias of spring 126 for a distance determined by keeper slots 128. Thus, it is possible, by appropriate selection of springs 126 and construction of keeper slots 128, to provide sufficient lost motion in hinges 112, 114 that belt impact to the sheets S can be cushioned and/or the belt be moved transversely into vertical alignment by stops 98, 100, as the case may be.

Although two preferred embodiments of the invention have been illustrated and described herein, variations will become apparent to one of ordinary skill in the art. Accordingly, the invention is not to be limited to the specific embodiments illustrated and described herein, and the true scope and spirit of the invention are to be determined by reference to the appended claims.

The embodiments of the invention in which an exclusive property or privilege is claimed are defined as follows:

1. Sheet binding apparatus, comprising: means for assembling sheets into individual groups within respective sheet holding compartments with the sheets having at least one of their edges aligned in a single plane; adhesive binding means including an adhesive application member and heat application means for applying adhesive to bind the sheets in at least one of said groups at a location along the length of the coplanar edges thereof; hold down means operatively associated with said binding means and said compartments for holding the sheets of said one group stationary to maintain copolar edge alignment thereof during binding; and means for controlling heat transfer between said adhesive application member and said heat application means by selectively positioning said adhesive application member with respect to said heat application means.

2. The apparatus of claim 1, wherein said means for controlling heat transfer include means intervening between said adhesive application member and said heat application means for selectively engaging and moving said adhesive application member relatively away from said heat application means a distance sufficient to control heat transfer therebetween.

3. The apparatus of claim 2, further comprising means overlying said adhesive application member for engaging and preventing it from moving relatively away from said heat application means more than a predetermined distance.

4. The apparatus of claim 1, wherein said adhesive application member is constituted by an endless belt and said heat application means are constituted by an elongated heat application platen underlying one run of said belt, said means for controlling heat transfer comprising;

- belt lifting means located adjacent the midportion of said one run and including two spaced apart fingers selectively movable toward an extended position in which they engage and lift opposed underlying edge portions of said belt with respect to said platen, and
- means operatively connected with said belt lifting means for applying a force causing said fingers to move toward a retracted position in which said belt is positioned in heat transfer relation with said platen.

5. The apparatus of claim 4, further comprising means overlying said belt adjacent said fingers for engaging and preventing said belt from being lifted with respect to said platen more than a predetermined distance.

6. The apparatus of claim 1, wherein said heat application means include an elongated platen having a longitudinal inner bore and an outer surface underlying said adhesive application member, and heating means located inside said bore for applying heat to said platen.

7. The apparatus of claim 6, wherein said heating means include hollow core cylindrical member having an outline which registers with said bore, and means within said member for producing heat.

8. The apparatus of claim 1, further comprising means mounted adjacent said compartments for engaging and positioning said adhesive application member in alignment with the copolanar sheet edges.

9. The apparatus of claim 1, further comprising means for moving said adhesive application member reciprocatively with respect to said compartments along a rectilinear first path parallel to the coplanar sheet edges, and along a rectilinear second path perpendicular to the coplanar sheet edges.

10. The apparatus of claim 9, wherein said means for moving said adhesive application member include first mounting means for supporting said adhesive application member for movement along said first path, first actuator means for causing said first mounting means to move said adhesive application member along said first path reciprocatively, second mounting means operatively connected with said first mounting means for supporting said adhesive application member for movement along said second path, and second actuator means for causing said second mounting means to move said adhesive application member along said second path reciprocatively.

11. The apparatus of claim 10, wherein said adhesive application member is constituted by an endless belt, and further comprising means mounted by said second mounting means for rotating said belt.

12. The apparatus of claim 11, wherein said means for rotating said belt are further operative for rotating said belt and incremental distance sufficient to present a fresh adhesive application surface upon completion of a first adhesive application to sheet stacks of a predetermined thickness.

13. The applicator of claim 1, further comprising hinge means for swinging said adhesive application member toward a binding position in contact with the coplanar sheet edges while simultaneously therewith effecting lost motion movement of said adhesive application member following initial sheet edge contact.

14. The apparatus of claim 1, wherein said hold down means are movable between a retracted position and a hold down position, and further comprising means operatively associated with said compartments for shielding said hold down means from contact with the sheets when said hold down means are at their retracted position during sheet assembly.

15. The apparatus of claim 14, wherein said compartments are formed by vertically spaced apart parallel shelves, and wherein said shielding means are constituted by dimples formed on the underside of said shelves at locations spaced from the edges thereof a sufficient distance that said dimples intervene between the sheets and said hold down means during sheet assembly.

16. In sheet binding apparatus including sheet holding compartments and movable adhesive binding means including an elongated adhesive application member having a planar adhesive bearing surface for binding at least one group of sheets within the respective compartment along a set of coplanar sheet edges, stop means mounted adjacent said compartments for engaging said binding means at two spaced apart locations to position said member such that the adhesive bearing surface thereof will be located in parallel alignment with the coplanar sheet edges during binding.

17. In sheet binding apparatus including sheet holding compartments, and adhesive binding means having a movable adhesive application member for applying an adhesive to bind the sheets of at least one group of sheets along a set of coplanar sheet edges while in the respective compartment, means for moving said adhesive application member reciprocatively with respect to said compartments along a rectilinear first path parallel to the coplanar sheet edges and along a rectilinear second path perpendicular to the coplanar sheet edges.

18. The apparatus of claim 17, wherein said means for moving said adhesive application member include first mounting means for supporting said adhesive application member for movement along said first path, first actuator means for causing said first mounting means to move said adhesive application member along said first path reciprocatively, second mounting means operatively associated with said first mounting means for supporting said adhesive application member for movement along said second path, and second actuator means for causing said second mounting means to move said adhesive application member along said second path reciprocatively.

19. The apparatus of claim 18, wherein said adhesive application member is constituted by an endless belt, and further comprising means mounted by said second mounting means for rotating said belt.

20. The apparatus of claim 19, wherein said means for rotating said belt are further operative for rotating said belt an incremental distance sufficient to present a fresh adhesive application surface upon completion of a first adhesive application to sheet stacks of a predetermined thickness.

21. In sheet binding apparatus including sheet holding compartments, and adhesive binding means having a movable adhesive application member for applying an adhesive to bind the sheets of at least one group of sheets along a set of coplanar sheet edges while in the respective compartment, hinge means for swinging said adhesive application member toward a binding position in contact with the coplanar sheet edges, while simultaneously therewith effecting lost motion movement of said adhesive application member following initial sheet edge contact.

* * * * *